United States Patent
Miwa et al.

(10) Patent No.: US 6,583,861 B2
(45) Date of Patent: Jun. 24, 2003

(54) RANGEFINDER APPARATUS

(75) Inventors: Yasuhiro Miwa, Saitama (JP); Tatsuo Saito, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/764,440

(22) Filed: Jan. 19, 2001

(65) Prior Publication Data

US 2001/0008443 A1 Jul. 19, 2001

(30) Foreign Application Priority Data

Jan. 19, 2000 (JP) ........................................ 2000-010862

(51) Int. Cl.⁷ .................... G01C 3/00; G03B 13/00; G02B 7/28
(52) U.S. Cl. ................. 356/3.04; 396/106; 396/120
(58) Field of Search ................. 356/3.04; 396/106, 396/120

(56) References Cited

U.S. PATENT DOCUMENTS 5,285,233 A  *  2/1994 Yoshida et al.
6,026,246 A      2/2000 Yoshida et al. ............. 396/106

FOREIGN PATENT DOCUMENTS

JP          10-274524         10/1998

* cited by examiner

Primary Examiner—Stephen C. Buczinski
(74) Attorney, Agent, or Firm—Leydig, Voit & Mayer, Ltd.

(57) ABSTRACT

In a rangefinder apparatus for projecting a light beam toward a target object a number of times; detecting light of the light beam reflected from the target object, and successively integrating output signals corresponding to the distance to the target object to carry out rangefinding; a voltage of an integrating capacitor in a rangefinding routine is detected, and the rangefinding routine is forcibly terminated if the voltage of the integrating capacitor is out of a preset range. Since the rangefinding routine is forcibly terminated if the voltage of the integrating capacitor in the rangefinding routine is outside of the preset range, malfunctions of a signal processing IC can be detected.

8 Claims, 6 Drawing Sheets

RANGEFINDER APPARATUS

BACKGROUND OF THE INVENTION

1. Field of the Invention

The present invention relates to a rangefinder apparatus for measuring the distance to a target object; and, in particular, to an active type rangefinder apparatus used in a camera or the like.

2. Related Background Art

Conventionally known as an active type rangefinder apparatus used in a camera or the like is one having light-detecting means for detecting light reflected from a target object and outputting near-side and far-side signals corresponding to the distance to the target object, comparing the far-side signal with a preset clamp signal in terms of magnitude, calculating an output ratio signal from the ratio between the greater signal determined by the comparison and the near-side signal, and converting the output ratio signal into a distance signal according to a converting expression varying depending on the value of output ratio signal as disclosed in Japanese Patent Application Laid-Open No. HEI 10-274524.

This rangefinder apparatus is aimed at obtaining rangefinding results on a par with those of a conventional system using both the light quantity and rangefinding in a short period of time without enhancing its circuit scale, so as to determine the distance to the target object uniquely and stably even when the distance is long.

Meanwhile, an operation of a signal processing IC for processing the output ratio signal and the like in this rangefinder apparatus is controlled in response to a control signal from a CPU. If noise is generated in this control signal, then the signal processing IC will not operate normally. Therefore, a plurality of control signals are fed into the signal processing IC, so as to prevent the latter from malfunctioning.

In this case, however, it is necessary to provide the signal processing IC with a plurality of input terminals for receiving the respective control signals. Installing such a plurality of input terminals inhibits reducing the cost of the signal processing IC. For cutting down the cost, it is desirable that the number of input terminals be smaller. In order for a single control signal to control an operation of the signal processing IC, it is necessary that, if an abnormality occurs in the operation due to noise or the like, then this abnormality be detected promptly.

SUMMARY OF THE INVENTION

In order to overcome such technical problems, it is an object of the present invention to provide a rangefinder apparatus which can promptly detect abnormalities in operations of its signal processing IC.

For achieving such an object, the present invention provides a rangefinder apparatus comprising light-projecting means for projecting a light beam toward a target object a plurality of times; light-receiving means for receiving reflected light of the light beam projected to the target object and outputting an output signal corresponding to a distance to the target object; signal processing means for charging or discharging an integrating capacitor according to the output signal of the light-receiving means and outputting an integrated signal according to a voltage value of the integrating capacitor; detecting means for detecting the voltage value of the integrating capacitor in a rangefinding routine; and forcible terminating means for terminating the rangefinding routine when the voltage value of the integrating capacitor is out of a preset range.

The rangefinder apparatus in accordance with the present invention may be configured such that, if it is determined that the voltage value of the integrating capacitor is out of the preset range, then the forcible terminating means repeats the rangefinding routine, and terminates the rangefinding routine if the voltage value of the integrating capacitor is also out of the preset range in thus repeated rangefinding routine.

In the rangefinder apparatus in accordance with the present invention, the signal processing means may receive a single control signal from control means and carry out signal processing thereof.

By appropriately detecting a voltage value of the integrating capacitor in a rangefinding routine, the present invention can detect whether the rangefinding routine is being carried out normally or not. As a consequence, abnormalities in operations of the rangefinder apparatus can be detected promptly.

If it is determined by detecting a voltage value of the integrating capacitor in a rangefinding routine that the rangefinding routine is not carried out normally, then the rangefinding routine can be started again, and the voltage value of integrating capacitor can be detected, so as to accurately determine whether the rangefinder apparatus is malfunctioning or not.

The present invention is effective in particular when the signal processing means carries out signal processing in response to a single control signal from control means. The present invention will be more fully understood from the detailed description given hereinbelow and the accompanying drawings, which are given byway of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

Figure 1:
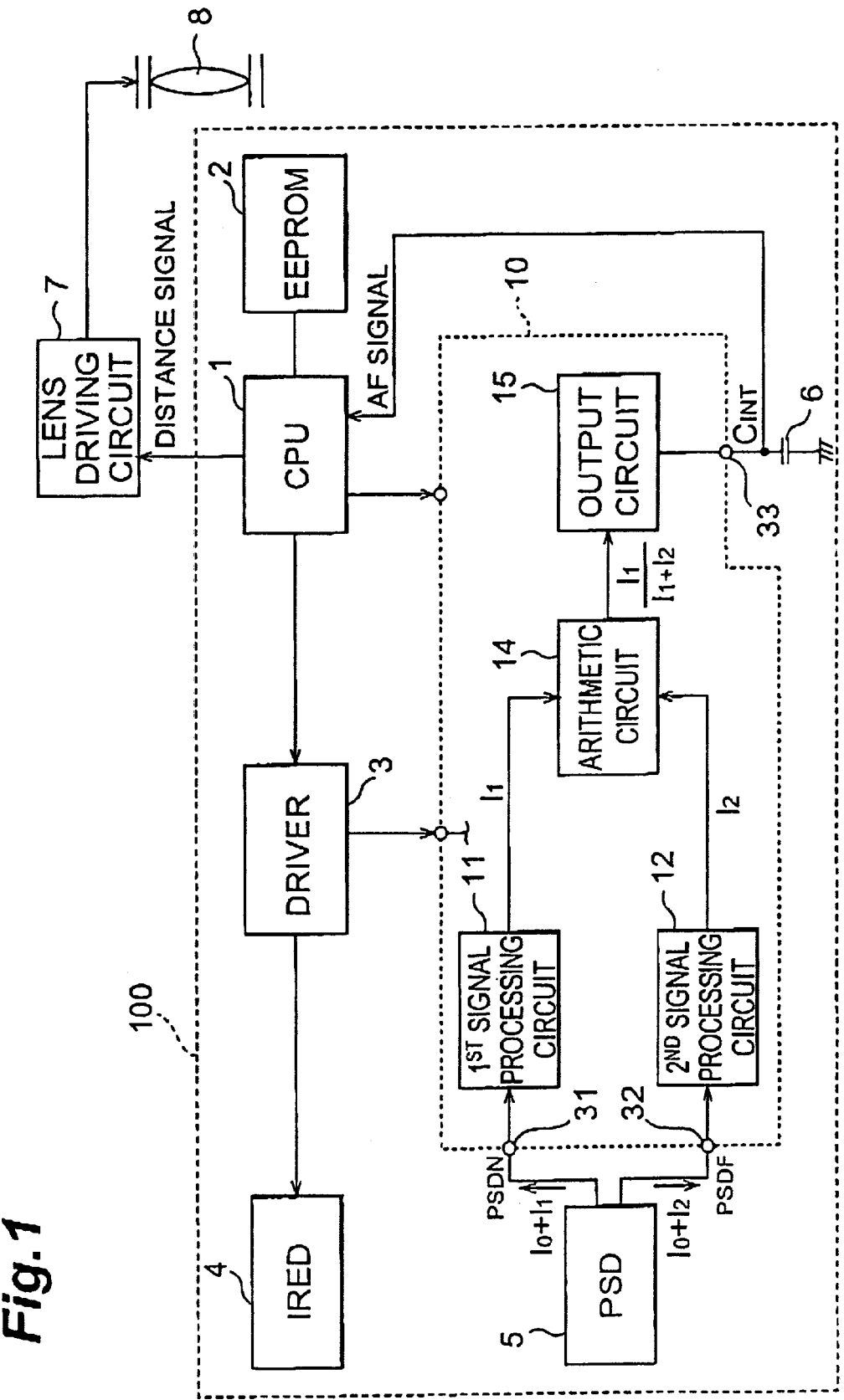
FIG. 1 is a schematic diagram of the rangefinder apparatus in accordance with a first embodiment of the present invention.

In the following, various embodiments of the present invention will be explained with reference to the accompanying drawings. Here, constituents identical to each other among the drawings will be referred to with numerals or letters identical to each other without repeating their overlapping explanations. The sizes and proportions in the drawings do not always match those explained.

First Embodiment

FIG. 1 is a schematic diagram of the rangefinder apparatus in accordance with a first embodiment.

As shown in FIG. 1, the rangefinder apparatus 100 in accordance with this embodiment comprises a CPU 1. The CPU 1 is used for controlling the whole camera equipped with the rangefinder apparatus 100. Namely, the CPU 1 controls the whole camera equipped with the rangefinder apparatus 100 according to programs and parameters which have been stored in an EEPROM 2 beforehand.

The rangefinder apparatus 100 is provided with an IRED (infrared emitting diode) 4. The IRED 4 functions as light-emitting means for projecting a light beam to a target object by emitting light. The IRED 4 is connected to the CPU 1 by way of a driver 3, so that its light emission is controlled by the CPU 1.

The driver 3 receives power supplied from a battery (not depicted) incorporated in the camera, and supplies the power, according to a control signal from the CPU 1, not only to the IRED 4 but also to camera components such as an autofocus IC (hereinafter referred to as "AFIC") 10. For example, a driver IC is used therefor.

The rangefinder apparatus 100 is also provided with a PSD (position sensing device) 5. The PSD 5 functions as light-receiving means for receiving each reflected beam of the projection light beam projected onto the target object from the IRED 4.

The rangefinder apparatus 100 further comprises the AFIC 10. The AFIC 10 functions as signal processing means for processing output signals of the PSD 5. Operations of the AFIC 10 are controlled by the CPU 1, whereas AF signals (integrated signals) outputted from the AFIC 10 are fed into the CPU 1.

When a projection light beam, which is infrared light, is emitted from the IRED 4, this beam is projected onto the target object by way of a light-projecting lens (not depicted) disposed in front of the IRED 4. A part of the projection light beam is reflected, and is received at a certain position on the light-receiving surface of PSD 5 by way of a light-receiving lens (not depicted) disposed in front of the PSD 5. This light-receiving position corresponds to the distance to the target object. Then, the PSD 5 outputs two signals $I_1$ and $I_2$ corresponding to the light-receiving position.

The signal $I_1$ is a near-side signal which attains a greater value as the distance is shorter if the quantity of received light is constant, whereas the signal $I_2$ is a far-side signal which attains a greater value as the distance is longer if the quantity of received light is constant. The sum of signals $I_1$ and $I_2$ represents the quantity of reflected light received by the PSD 5. The near-side signal $I_1$ is fed to the PSDN terminal of AFIC 10, whereas the far-side signal $I_2$ is fed to the PSDF terminal of AFIC 10. In practice, however, respective signals including a steady-state light component $I_0$ in addition to the signals $I_1$ and $I_2$ are fed into the AFIC 10 due to external conditions.

The AFIC 10 is an integrated circuit (IC) comprising a first signal processing circuit 11, a second signal processing circuit 12, an arithmetic circuit 14, and an output circuit 15.

The first signal processing circuit 11 receives the signal $I_1+I_0$ outputted from the PSD 5, eliminates the steady-state light component $I_0$ included therein, and outputs the near-side signal $I_1$. The second signal processing circuit 12 receives the signal $I_2+I_0$ outputted from the PSD 5, eliminates the steady-state light component $I_0$ included therein, and outputs the far-side signal $I_2$.

The arithmetic circuit 14 receives the near-side signal $I_1$ outputted from the first signal processing circuit 11 and the far-side signal $I_2$ outputted from the second signal processing circuit 12, calculates an output ratio $(I_1/(I_1+I_2))$, and outputs an output ratio signal representing the result thereof. This output ratio $(I_1/(I_1+I_2))$ represents the light-receiving position on the light-receiving surface of PSD 5, i.e., the distance to the target object.

The output circuit 15 receives the output ratio signal, and integrates the output ratio a number of times in cooperation with an integrating capacitor 6 connected to the $C_{INT}$ terminal of AFIC 10, thereby improving the S/N ratio. Here, the integration of output ratio to the integrating capacitor 6 is carried out as the integrating capacitor 6 in a discharged state is gradually charged according to the output ratio signal.

Then, thus integrated output ratio is outputted as an AF signal (integrated signal) from the $S_{OUT}$ terminal of AFIC 10. The CPU 1 receives the AF signal outputted from the AFIC 10, carries out a predetermined arithmetic operation so as to convert the AF signal into a distance signal, and sends out the distance signal to a lens driving circuit 7. The lens driving circuit 7 operates a taking lens 8 so as to place it in focus according to the distance signal.

Figure 2:
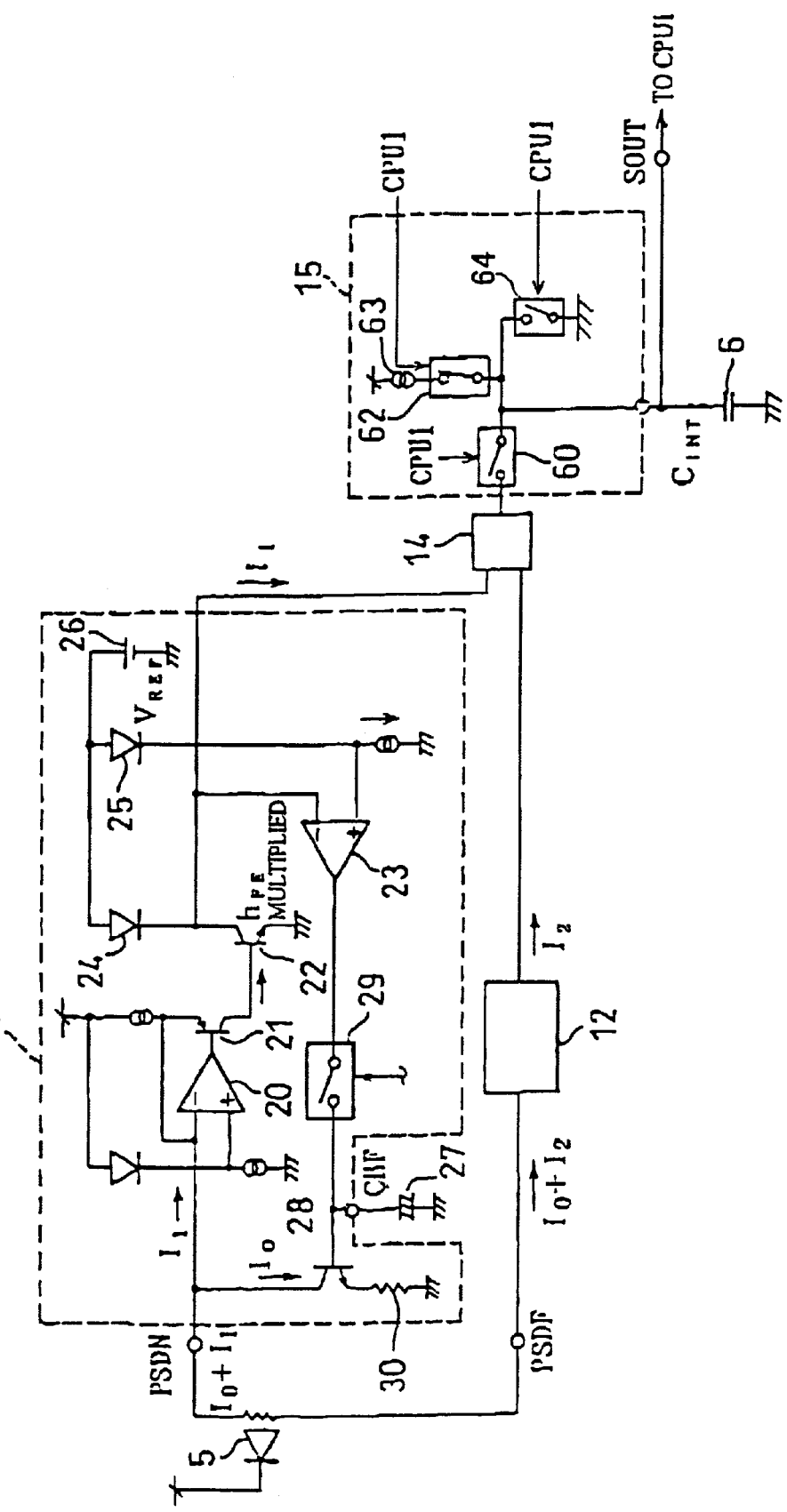
FIG. 2 is an explanatory diagram of the signal processing circuit and the like in the rangefinder apparatus of FIG. 1.

FIG. 2 is a view showing a specific configuration of the first signal processing circuit 11 and output circuit 15. The second processing circuit 12 has a circuit configuration similar to that of the first signal processing circuit 11.

As shown in FIG. 2, the first signal processing circuit 11 inputs the near-side signal $I_1$ and steady-state light component $I_0$ outputted from the PSD 5, eliminates the steady-state light component $I_0$, and outputs the near-side signal $I_1$. The current $(I_1+I_0)$ outputted from the shorter-distance-side terminal of PSD 5 is fed to the "−" input terminal of an operational amplifier 20 in the first signal processing circuit 11 by way of the PSDN terminal of AFIC 10. The output terminal of operational amplifier 20 is connected to the base terminal of a transistor 21, whereas the collector terminal of transistor 21 is connected to the base terminal of a transistor 22. The "−" input terminal of an operational amplifier 23 is connected to the collector terminal of transistor 22, and the cathode terminal of a compression diode 24 is also connected to this collector terminal. The cathode terminal of a compression diode 25 is connected to the "+" input terminal of operational amplifier 23, whereas a first reference power source 26 is connected to the respective anode terminals of compression diodes 24 and 25.

Also, a steady-state light eliminating capacitor 27 is externally attached to the CHF terminal of AFIC 10. The steady-state light eliminating capacitor 27 is connected to the base terminal of a steady-state light eliminating transistor 28 within the first signal processing circuit 11. The steady-state light eliminating capacitor 27 and the operational amplifier 23 are connected to each other by way of a switch 29, whose ON/OFF is controlled by the CPU 1. The collector terminal of steady-state light eliminating transistor 28 is connected to the "−" input terminal of operational amplifier 20, whereas the emitter terminal of transistor 28 is connected to one end of a resistor 30 whose other end is grounded.

The output circuit 15 in FIG. 2, on the other hand, comprises the integrating capacitor 6 externally attached to the $C_{INT}$ terminal of AFIC 10. The integrating capacitor 6 is connected to the output terminal of arithmetic circuit 14 by way of a switch 60 and to a constant current source 63 by way of a switch 62, and is grounded by way of a switch 64. The switches 60, 62, and 64 are controlled by control signals from the CPU 1. If the switch 62 is turned on, then the integrating capacitor 6 can be charged with the constant current source 63. If the switch 64 is turned on, by contrast, then the integrating capacitor 6 can be discharged.

Operations of the rangefinder apparatus in accordance with this embodiment will now be explained.

Figure 3:
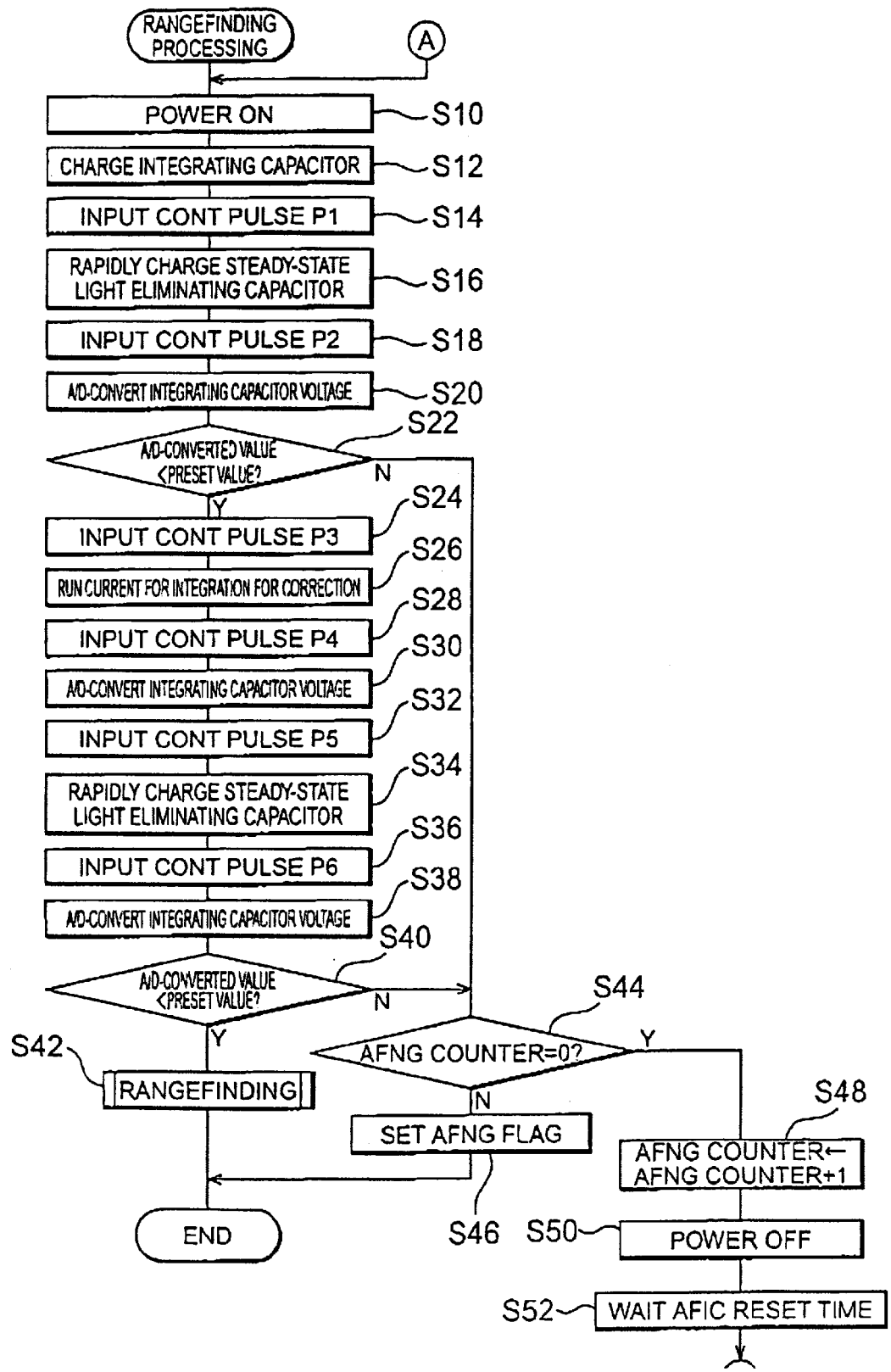
FIG. 3 is a flowchart concerning operations of the rangefinder apparatus in accordance with the first embodiment.
Figure 4:
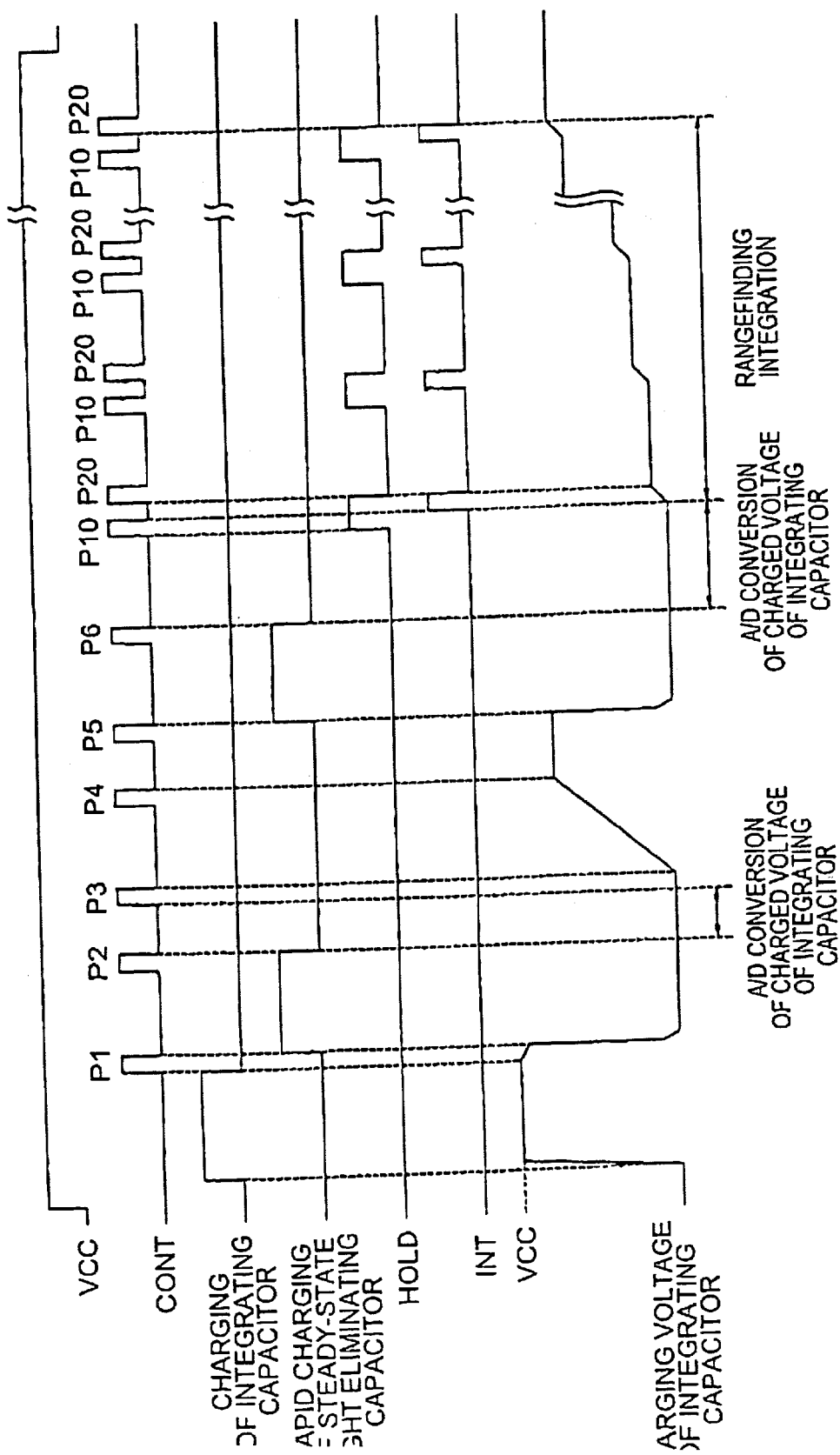
FIG. 4 is a timing chart concerning operations of the rangefinder apparatus in accordance with the first embodiment.

FIG. 3 is a flowchart concerning operations of the rangefinder apparatus. FIG. 4 is a timing chart concerning operations of the rangefinder apparatus.

Upon a camera operation such as shutter release, control processing for a rangefinding routine is started, whereby power supply to the AFIC 10 begins at S10 in FIG. 3. Namely, a control signal is fed from the CPU 1 to the driver 3, whereby a supply voltage is supplied from the driver 3 to the AFIC 10. In response to the power supply, the integrating capacitor 6 is charged in the AFIC 10 (S12). The charging of integrating capacitor 6 is carried out as measures against the dielectric absorption of integrating capacitor 6.

After the lapse of a predetermined period of time from the charging of integrating capacitor 6, a pulse P1 is fed as a control signal (CONT) from the CPU 1 to the AFIC 10 (S14). At the falling edge of this pulse P1, the charged voltage of integrating capacitor 6 is discharged, whereby the steady-state light eliminating capacitor 27 is rapidly charged (S16). Thereafter, a pulse P2 is inputted as the control signal from the CPU 1 (S18), whereby the charged voltage of integrating capacitor 6 is A/D-converted, and the resulting A/D-converted value is read into the CPU 1 (S20).

Subsequently, the flow shifts to S22, at which it is determined whether thus read A/D-converted value is smaller than a preset value or not. If it is determined that the A/D-converted value is smaller than the preset value at S22, then a pulse P3 as the control signal is inputted, whereby an integration for correction is carried out (S24, S26). This integration for correction is carried out by causing a constant current to flow through the integrating capacitor 6 for a predetermined period of time. Then, the flow shifts to S28, at which a pulse P4 as the control signal is inputted, whereby the charged voltage of integrating capacitor 6 is A/D-converted, and the resulting A/D-converted value is read into the CPU 1 (S30).

CPU 1 calculates the capacity of the integrating capacitor 6 from the A/D-converted voltage value. The correction of the rangefinding results according to the calculated actual capacity improves the rangefinding accuracy.

Further, the flow shifts to S32, at which a pulse P5 as the control signal is inputted. At the falling edge of this pulse, the integrating capacitor 6 is discharged, whereby the steady-state light eliminating capacitor 27 is rapidly charged (S34). Thereafter, a pulse P6 is inputted as the control signal (S36), and the charged voltage of integrating capacitor 6 is A/D-converted again, so as to be read into the CPU 1 (S38). Then, the flow shifts to S40, at which whether thus read A/D-converted value is smaller than a preset value or not is determined.

If it is determined at S40 that the A/D-converted value is smaller than the preset value, then the flow shifts to S42, whereby a rangefinding operation is carried out. Namely, the IRED 4 emits light a plurality of times at constant intervals of time, the output ratio signal is calculated according to the near-side signal and far-side signal outputted from the PSD 5 at each light emission, and the integrating capacitor 6 is repeatedly charged with the voltage corresponding to the output ratio signal (range finding integrating operation). After the completion of a predetermined number of charging operations (rangefinding integrating operations), the charged voltage of integrating capacitor 6 is A/D-converted, thus converted value is read into the CPU 1, and the distance to the target object is computed according to the A/D-converted value. The rangefinding operation may also be carried out such that the integrating capacitor 6 is charged with a predetermined voltage beforehand and then a voltage corresponding to the output ratio signal is repeatedly discharged therefrom.

If it is determined at S22 in FIG. 3 that the A/D-converted value is not smaller than the preset value, then it is determined that the rangefinding routine is not carried out normally, whereby the flow shifts to S44. At S44, it is determined whether AFNG counter is zero or not. If it is determined at S44 that the AFNG counter is not zero, then the flow shifts to S46, at which AFNG flag is set. In this case, the taking lens is placed in focus with the distance to the target object being set to a certain constant length (e.g., 2 m), or an error display (blinking display) or the like is carried out, and then the rangefinding processing is terminated.

If it is determined at S44 that the AFNG counter is zero, then "1" is added to the counter value of AFNG (S48), and the power supply to the AFIC 10 is stopped (S50). After the lapse of a predetermined period of time from the stopping of power supply (S52), the flow returns to S10, whereby power is fed to the AFIC 10 again.

Meanwhile, if it is determined at S40 that the A/D-converted value is not smaller than the preset value, then it is determined that the rangefinding routine is not carried out normally, so that the flow shifts to S44, whereby the processing is carried out as mentioned above.

As in the foregoing, by appropriately detecting the charged voltage of integrating capacitor 6 in a rangefinding routine, the rangefinder apparatus in accordance with this embodiment can determine whether the rangefinding routine is normally carried out or not. As a consequence, abnormalities in operations of the rangefinder apparatus can be detected promptly.

Figure 5:
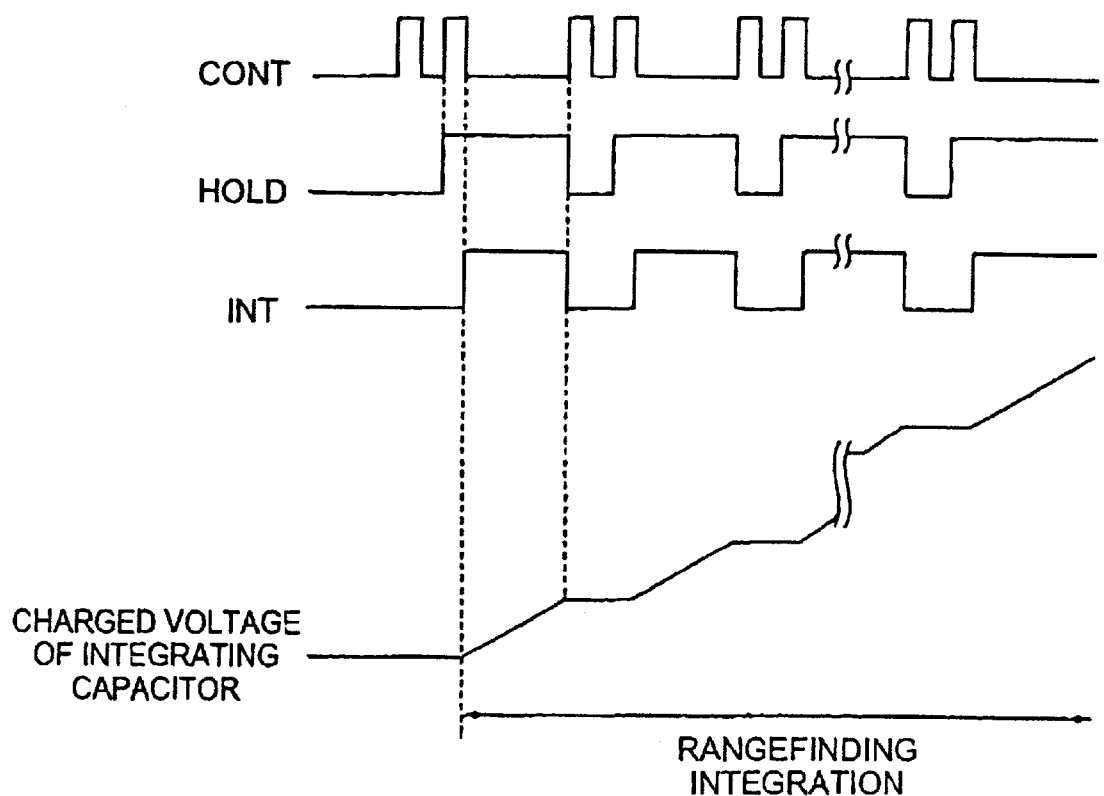
FIG. 5 is an explanatory chart for an abnormal operation in a rangefinder apparatus.

The present invention is effective in particular when an operation of the AFIC 10 carrying out signal processing is controlled by a single control signal from the CPU 1 as in the rangefinder apparatus in accordance with this embodiment. For example, though there is a fear of rangefinding integrating operation timings shifting due to noise entering the control signal (CONT) as shown in FIG. 5, such a malfunction can be detected promptly, so as to take measures thereagainst.

If it is determined in a rangefinding routine by detecting the charged voltage of integrating capacitor 6 that the rangefinding routine is not carried out normally, then the rangefinding routine can be started once again, and the charged voltage of integrating capacitor 6 can be detected, so as to accurately determine whether the rangefinder apparatus is malfunctioning or not.

Second Embodiment

The rangefinder apparatus in accordance with a second embodiment will now be explained.

The rangefinder apparatus in accordance with this embodiment has a configuration substantially the same as that of the rangefinder apparatus in accordance with the first embodiment, but differs therefrom in that, if the A/D-converted value of charged voltage of integrating capacitor 6 is smaller than a preset value in a rangefinding routine, then the rangefinding routine is terminated without repeating the rangefinding routine. For example, if the A/D-converted value is smaller than the preset value at S22 and S40 in the flowchart of FIG. 3, then the rangefinding processing is terminated.

Such a rangefinder apparatus is effective in that it can detect malfunctions of the rangefinder apparatus promptly as with the rangefinder apparatus in accordance with the first embodiment.

Third Embodiment

Though the rangefinder apparatus in accordance with the first and second embodiments determine that a rangefinding routine is not carried out normally if the A/D-converted value of charged voltage of integrating capacitor 6 is smaller than a preset value, the rangefinder apparatus in accordance with the present invention is not restricted thereto. The rangefinder apparatus may determine that the rangefinding routine is abnormal in a case other than the case where the A/D-converted value is smaller than the preset value, as long as it determines that the rangefinding routine is not carried out normally if the A/D-converted value of charged voltage of integrating capacitor 6 is out of a preset range.

Fourth Embodiment

Although the rangefinder apparatus in accordance with the first, second and third embodiments carry out the rangefinding operation once, the rangefinder apparatus in accordance with the present invention is not restricted thereto.

The rangefinder apparatus may carry out the rangefinding operation many times and calculate a distance to the target object according to results of the rangefinding operations.

Here, "rangefinding operation" refers to an operation in which light-projecting action by the IRED 4, light-receiving action by the PSD 5, and discharging actions to the integrating capacitor 6 are repeated a predetermined number of times.

Figure 6:
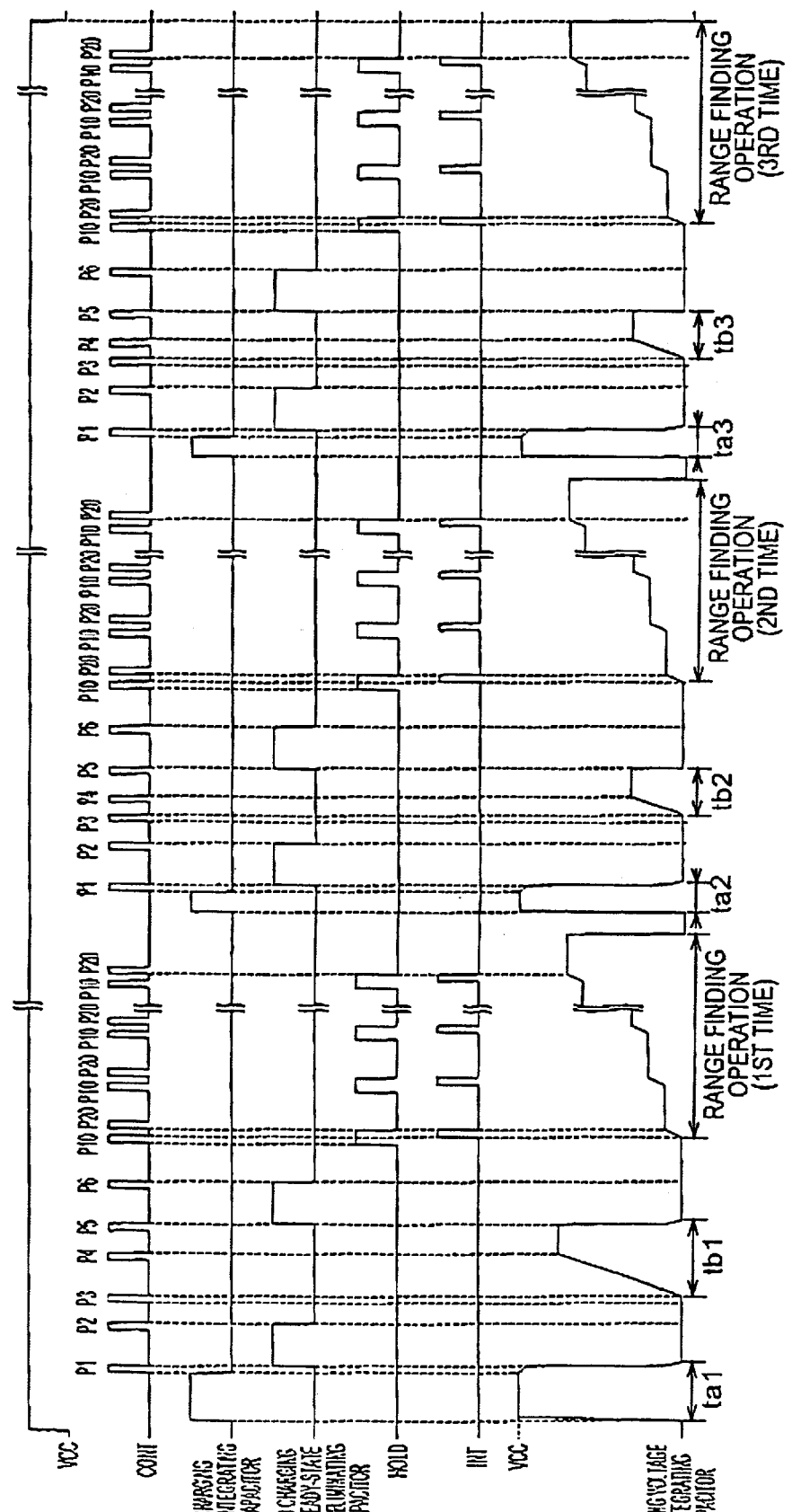
FIG. 6 is a timing chart concerning operations of the rangefinder apparatus in accordance with a fourth embodiment.

FIG. 6 is a timing chart showing the rangefinding operations carried out three times. As shown in FIG. 6, when the rangefinding operations are carried out multiple times, charging times ta2, ta3 of integrating capacitor 6 in the second and later rangefinding operation are desirably shorter than charging time ta1 of integrating capacitor 6 in the first rangefinding operation.

Further, times tb2, tb3 of integration for correction in the second and later rangefinding operations are desirably shorter than time tb1 of integration for correction in the first rangefinding operation.

As in the foregoing, by shortening the charging time and the integrating time for correction in the second and later rangefinding operations, the rangefinder apparatus in accordance with this embodiment can reduce the time required for rangefinding and decrease a time lag.

Also, by carrying out the rangefinding operations multiple times and by taking an average of rangefinding results, the rangefinding accuracy can be improved.

When the rangefinding operations are carried out multiple times, the results of the first integration for correction can be used during the second and later rangefinding operations. Consequently correction integration during the second and later rangefinding operations may be omitted. In the rangefinder apparatus in accordance with this embodiment, control processing operations are carried out according to pulses in the control signal, therefore time for integration for correction in the second and later rangefinding operations is reduced.

The rapid charging (charging at a time ta1 in FIG. 6) of the integrating capacitor 6 in the first rangefinding operation reduces the dielectric absorption of integrating capacitor 6. Consequently the second and later rangefinding operations may omit the rapid charging step. In the rangefinder apparatus in accordance with this embodiment, control processing operations are carried out according to pulses in the control signal, therefore time for rapid charging in the second and later rangefinding operations is reduced.

As explained in the foregoing, whether a rangefinding routine is normally carried out or not can be determined in the present invention by appropriately detecting a voltage value of an integrating capacitor in the rangefinding routine. Consequently, abnormalities in operations of the rangefinder apparatus can be detected promptly.

If it is determined by detecting a voltage value of the integrating capacitor in a rangefinding routine that the rangefinding routine is not carried out normally, then the rangefinding routine can be started again, and the voltage value of integrating capacitor can be detected, so as to accurately determine whether the rangefinder apparatus is malfunctioning or not.

The present invention is effective in particular when signal processing means carries out signal processing in response to a single control signal from control means.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A rangefinder apparatus comprising:
   light-projecting means for projecting a light beam toward a target object, located at a distance to be determined, a plurality of times;
   light-detecting means for detecting light of the light beam reflected from the target object and outputting a signal corresponding to the distance to the target object;
   signal processing means charging or discharging an integrating capacitor according to the signal output by said light-detecting means and outputting an integrated signal according to voltage of the integrating capacitor;
   detecting means for detecting the voltage of the integrating capacitor before rangefinding; and
   a central processing unit (CPU) controlling said light-projecting means, said light-detecting means, and said signal processing means, wherein, before rangefinding, said CPU controls said signal processing means to discharge the integrating capacitor,
   said CPU controls said detecting means to detect the voltage of the integrating capacitor after discharging of the integrating capacitor, and,
   when the voltage of the integrating capacitor detected by said detecting means is outside a fixed range, said CPU prevents said light-projecting means from projecting the light beam toward the target object.

2. The rangefinder apparatus according to claim 1, wherein said signal processing means receives a single control signal from said CPU and carries out signal processing in response to the single control signal.

3. The rangefinder apparatus according to claim 1, wherein said light-projecting means projects infrared light toward the target object.

4. The rangefinder apparatus according to claim 1, wherein said light-detecting means is a position sensing device.

5. The rangefinder apparatus according to claim 1, wherein said rangefinder apparatus is disposed in a camera.

6. The rangefinder apparatus according to claim 1, wherein, when said CPU prevents said light-projecting means from projecting the light beam toward the target object a first time, said CPU, after a delay, causes said signal processing means to discharge the integrating capacitor a second time, said CPU controls said detecting means to detect the voltage of the integrating capacitor a second time, and, if the voltage of the integrating capacitor detected the second time is outside the range, said CPU terminates operation of said rangefinder apparatus.

7. The rangefinder apparatus according to claim 1, wherein, when the voltage of the integrating capacitor detected by said detecting means is within the fixed range, said CPU controls said signal processing means to charge the integrating capacitor and to discharge, a second time, the integrating capacitor, said CPU controls said detecting means to detect the voltage of the integrating capacitor after being discharged the second time, and, if the voltage of the integrating capacitor detected by said detecting means, after discharging the integrating capacitor a second time, is outside the fixed range, said CPU prevents said light-projecting means from projecting the light beam toward the target object.

8. The rangefinder apparatus according to claim 7, wherein, when, after discharging the integrating capacitor a second time, said CPU prevents said light-projecting means from projecting the light beam toward the target object a first time, said CPU, after a delay, causes said signal processing means to discharge the integrating capacitor a third time, said CPU controls said detecting means to detect the voltage of the integrating capacitor a third time, and, if the voltage of the integrating capacitor detected the third time is outside the range, said CPU terminates operation of said rangefinder apparatus.

* * * * *